United States Patent
Nicolas (12) 
(10) Patent No.: US 9,264,754 B2
(45) Date of Patent: Feb. 16, 2016

(54) PACKET SYNCHRONIZATION RECEIVER

(75) Inventor: Frederic Nicolas, Chateaugiron (FR)

(73) Assignee: Silicon Laboratories Inc., Austin, TX (US)

( * ) Notice: Subject to any disclaimer, the term of this patent is extended or adjusted under 35 U.S.C. 154(b) by 1089 days.

(21) Appl. No.: 13/289,850

(22) Filed: Nov. 4, 2011

(65) Prior Publication Data
US 2013/0114423 A1  May 9, 2013

(51) Int. Cl.
| | |
|---|---|
| H04N 21/43 | (2011.01) |
| H04L 29/06 | (2006.01) |
| H04J 3/06 | (2006.01) |
| H04N 21/438 | (2011.01) |
| H04N 21/61 | (2011.01) |

(52) U.S. Cl.
CPC .......... *H04N 21/4302* (2013.01); *H04J 3/0632* (2013.01); *H04L 29/06027* (2013.01); *H04N 21/4382* (2013.01); *H04N 21/6112* (2013.01)

(58) Field of Classification Search
None
See application file for complete search history.

(56) References Cited

U.S. PATENT DOCUMENTS

| | | | | |
|---|---|---|---|---|
| 6,044,396 | A * | 3/2000 | Adams | 725/95 |
| 6,166,667 | A | 12/2000 | Park | |
| 6,405,338 | B1 | 6/2002 | Sinha et al. | |
| 7,126,957 | B1 * | 10/2006 | Isukapalli et al. | 370/412 |
| 7,523,377 | B2 | 4/2009 | Halter | |
| 8,151,305 | B2 | 4/2012 | Doerr et al. | |
| 8,363,738 | B2 | 1/2013 | Gorokhov et al. | |
| 2003/0014763 | A1 * | 1/2003 | Chappell et al. | 725/111 |
| 2007/0033494 | A1 | 2/2007 | Wenger et al. | |
| 2009/0164866 | A1 | 6/2009 | Nakamura et al. | |
| 2010/0251078 | A1 | 9/2010 | Yokokawa et al. | |
| 2010/0284472 | A1 | 11/2010 | Liao et al. | |
| 2011/0037904 | A1 * | 2/2011 | Yokokawa et al. | 348/725 |
| 2011/0274204 | A1 | 11/2011 | Ko et al. | |
| 2013/0117624 | A1 | 5/2013 | Nicolas et al. | |

OTHER PUBLICATIONS

"Digital Video Broadcasting (DVB); Frame structure channel coding and modulation for a second generation digital terrestrial television broadcasting system (DVB-T2)," European Standard (Telecommunications Series) ETSI EN 302 755 V1.1.1 (Sep. 2009), 167 pages, accessed Nov. 4, 2011 at http://www.etsi.org/deliver/etsi_en/302700_302799/302755/01.01.01_60/en_302755v010101p.pdf.

* cited by examiner

*Primary Examiner* — Kouroush Mohebbi
(74) *Attorney, Agent, or Firm* — Abel Law Group, LLP (57) ABSTRACT

A method includes generating, based on at least one received signal, a first packet stream and a second packet stream. One of the first and second packet streams includes a packet associated with the other of the first and second packet streams. The first and second packet streams indicate respective buffer configuration sizes. The method further includes, prior to determining the respective buffer configuration sizes indicated by the first and second packet streams, allocating respective first and second portions of a dejitter buffer to the first and second packet streams. In at least one embodiment of the method, the allocating is performed by hardware coupled to the dejitter buffer.

19 Claims, 8 Drawing Sheets

```
While (NBITS, DELTA_ISCR) not available loop
End loop
TS_PERIOD = 0
TS_NBITS  = 0
Compute   = 1
While compute=1 loop
   next_period_1 = ts_period + basis_period/2
   next_period_2 = ts_period + basis_period
   if next_period_1>=1000000000 then
     compute=0
     ts_nbits = ts_nbits + NBITS/2
   elsif next_period_2>=1000000000 then
     compute=0
     ts_nbits = ts_nbits + NBITS
   else
     ts_period = next_period_2
     ts_nbits  = ts_nbits + NBITS
   end if
end loop
TS_RATE = ts_nbits
```

*FIG. 6*

```
While (NBITS, DELTA_ISCR) not available loop
End loop
TS_PERIOD = 0
TS_NBITS  = 0
Compute   = 1
While compute=1 loop
   next_period_1 = ts_period + basis_period/4
   next_period_2 = ts_period + basis_period/2
   next_period_3 = ts_period + basis_period/2 + basis_period/4
   next_period_4 = ts_period + basis_period
   if next_period_1>=1000000000 then
     compute=0
     ts_nbits = ts_nbits + NBITS/4
   elsif next_period_2>=1000000000 then
     compute=0
     ts_nbits = ts_nbits + NBITS/2
   elsif next_period_3>=1000000000 then
     compute=0
     ts_nbits = ts_nbits + NBITS/2 + NBITS/4
   elsif next_period_4>=1000000000 then
     compute=0
     ts_nbits = ts_nbits + NBITS
   else
     ts_period = next_period_4
     ts_nbits  = ts_nbits + NBITS
   end if
end loop
TS_RATE = ts_nbits
```

PACKET SYNCHRONIZATION RECEIVER

CROSS-REFERENCE TO RELATED APPLICATION(S)

This application is related to U.S. patent application Ser. No. 13/289,390, entitled "Receive Data Flow Path Using Single FEC Decoder," naming Frederic Nicolas, Olivier Souloumiac, and David Rault as inventors, which application is being filed the same day as the present application, and which application is incorporated by reference herewith in its entirety.

BACKGROUND

1. Field of the Invention

The present disclosure is generally related to receivers and more specifically to receivers for synchronizing packets.

2. Description of the Related Art

Multiplexing wireless signals enables transmission of several data signals concurrently. For example, orthogonal frequency division multiplexing (OFDM) techniques can transmit multiple data signals using respective multiple subcarriers.

In some contexts, packets corresponding to multiple data signals can be combined. For example, the Digital Video Broadcasting—Second Generation Terrestrial (DVB-T2) standard features a common physical layer pipe (PLP) used to transmit packets shared by multiple data PLPs. However, packets received via the common PLP may be misaligned with respect to packets of the data PLP (i.e., the input streams may be jittered). Synchronizing the packets can consume significant time and processing resources.

SUMMARY

In at least one embodiment, a method includes generating, based on at least one received signal, a first packet stream and a second packet stream. One of the first and second packet streams includes a packet associated with the other of the first and second packet streams. The first and second packet streams indicate respective buffer configuration sizes. The method further includes, prior to determining the respective buffer configuration sizes indicated by the first and second packet streams, allocating respective first and second portions of a dejitter buffer to the first and second packet streams. In at least one embodiment of the method, the allocating is performed by hardware coupled to the dejitter buffer.

In at least one embodiment, an apparatus includes a dejitter buffer coupled to store packets of first and second packet streams that include respective first and second fields indicating respective first and second buffer configuration sizes of the dejitter buffer. The apparatus further includes logic coupled to allocate respective first and second portions of the dejitter buffer to the first and second packet streams prior to determining the respective first and second buffer configuration sizes.

In at least one embodiment, a method includes incrementing a first counter by a time period value until a value indicated by the counter reaches or exceeds a threshold value. The method further includes, while the value indicated by the first counter is less than the threshold value, incrementing a second counter to indicate a number of processed bits. The method further includes, in response to determining that the value indicated by the first counter has reached or exceeds the threshold value, determining the number of processed bits indicated by the second counter.

In at least one embodiment, an apparatus includes a first counter coupled to count time periods associated with a packet stream. The apparatus further includes a second counter coupled to count bits of the packet stream while the first counter indicates a value less than a threshold value. When the value indicated by the first counter reaches the threshold value, a value indicated by the second counter substantially corresponds to a read rate at which packets of the packet stream are to be read.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE PREFERRED EMBODIMENT(S)

Figure 1:
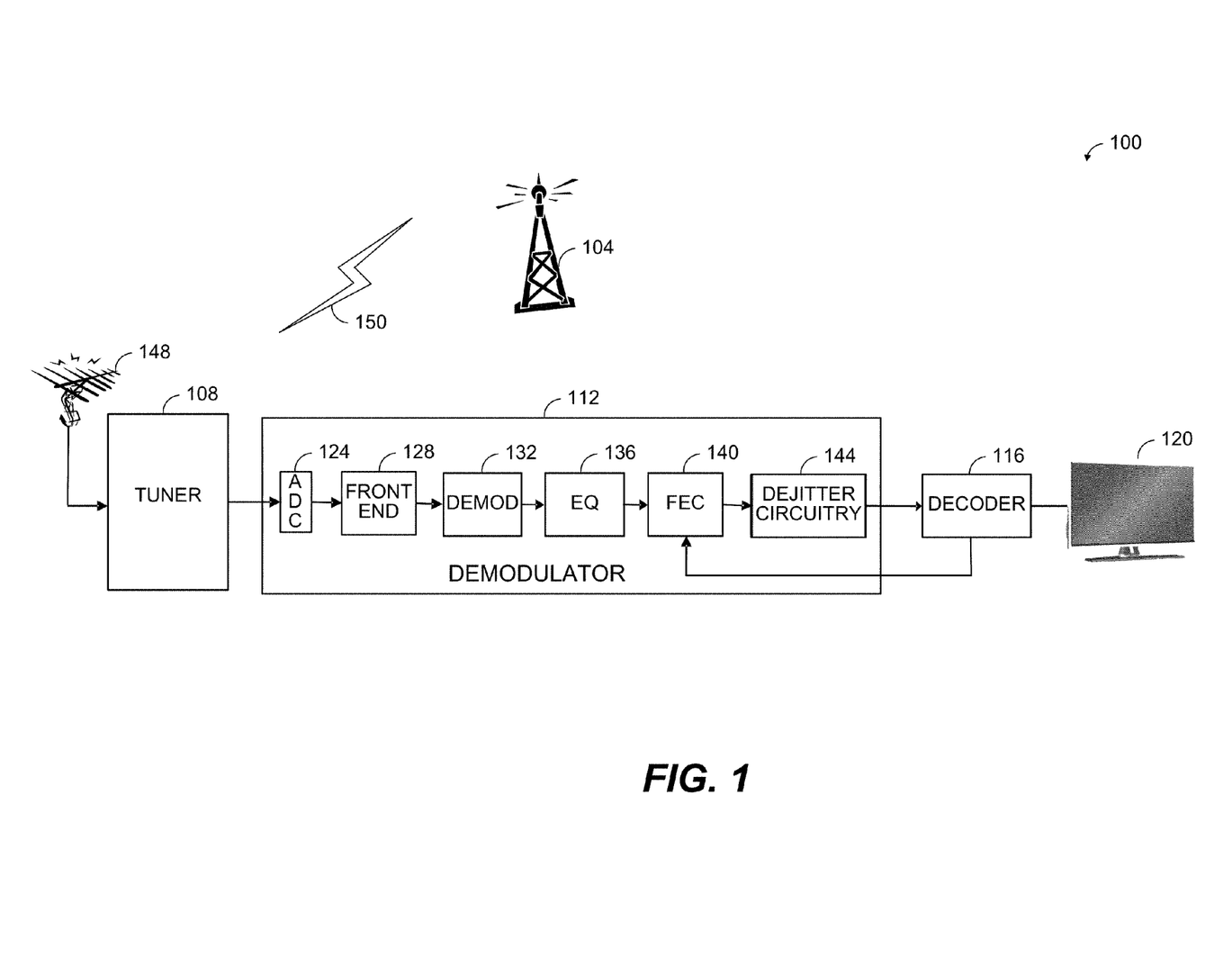
FIG. 1 is a block diagram of a communications system according to at least one embodiment of the invention.

Referring to FIG. 1, in at least one embodiment, communications system 100 includes a transmitter 104, a tuner 108, a demodulator 112, a decoder 116, and a display device 120. In at least one embodiment, demodulator 112 includes analog-to-digital converter (ADC) 124, front-end circuitry 128, demodulation circuitry 132, equalizer 136, forward error correction (FEC) circuitry 140, and dejitter circuitry 144. Tuner 108 may be coupled to or may include antenna 148.

In operation, transmitter 104 transmits one or more signals, such as signal 150, that are received by tuner 108 via antenna 148. In at least one embodiment, the signals transmitted by transmitter 104 are digital terrestrial television signals, such as signals compliant with the Digital Video Broadcasting—Second Generation Terrestrial (DVB-T2) standard. Tuner 108 may tune to a selected channel and receive one or more signals transmitted by transmitter 104, such as signal 150. In at least one embodiment, tuner 108 provides the received signal to demodulator 112.

In at least one embodiment, ADC 124 converts the received signal to a digital signal and front-end circuitry 128 performs initial processing on the digital signal, such as frequency shifting and filtering. In at least one embodiment, equalizer 136 equalizes the converted signal to adjust for characteristics of the medium (e.g., one or more wireless channels) through which the transmitted signal is received, such as channel estimation. FEC circuitry 140 may decode the equalized signal to generate a decoded signal and may further provide the decoded signal to dejitter circuitry 144.

In at least one embodiment, dejitter circuitry 144 processes (e.g., synchronizes) packet streams corresponding to signal 150. In at least one embodiment, signal 150 is a radio-frequency (RF) signal that includes several portions or "pipes," each pipe carrying a respective packet stream. Accordingly, a single signal received at tuner 108 may be processed into multiple (e.g., two) packet streams, which may then be buffered at dejitter circuitry 144.

In at least one embodiment, dejitter circuitry 144 processes packet streams corresponding to a data physical layer pipe (PLP) and a common PLP of a DVB-T2 communication. The common PLP packet stream may include at least one packet to be synchronized with (e.g., inserted at an appropriate part of) the data PLP packet stream. In at least one embodiment, the common PLP packet stream and the data PLP packet stream are received sequentially from FEC circuitry 140 and are therefore jittered with respect to each other. In at least one embodiment, dejitter circuitry 144 buffers and outputs the packet streams at a regular rate that corresponds to the transport rate at emission from transmitter 104. In at least one embodiment, and as described further below, dejitter circuitry 144 facilitates synchronization of packets during one interleaving frame of a received DVB-T2 signal.

In at least one embodiment, dejitter circuitry 144 provides an output signal to decoder 116. Decoder 116 may perform suitable processing on the output signal, such as generating an audio/visual (A/V) signal usable by display device 120. Decoder 116 may provide control data to FEC circuitry 140, such as PLP identification (PLP_ID) data.

Figure 2:
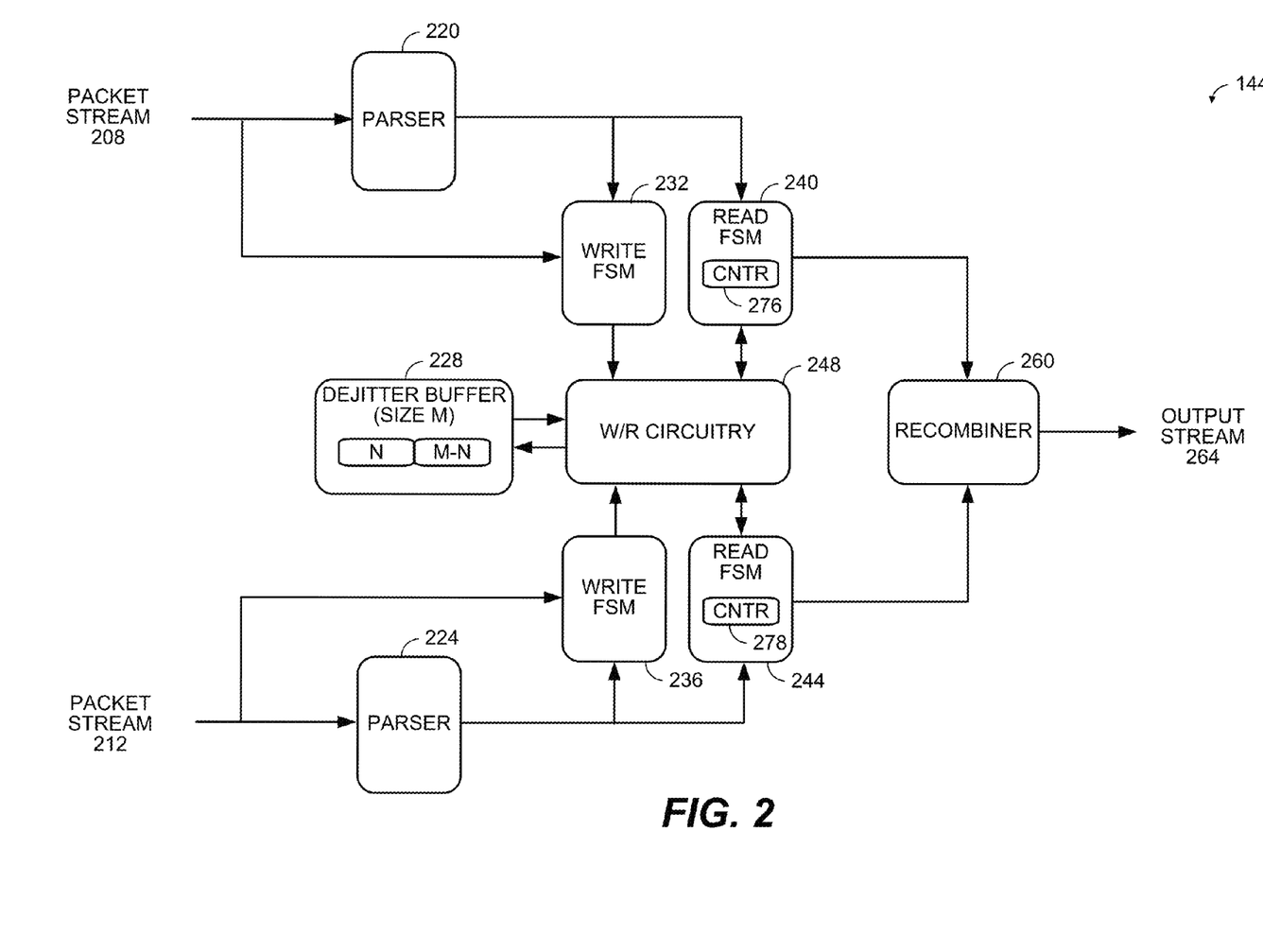
FIG. 2 is a block diagram of dejitter circuitry according to at least one embodiment of the invention.

Referring to FIG. 2, in at least one embodiment, dejitter circuitry 144 is responsive to packet streams 208 and 212, which are provided to parsers 220 and 224, respectively. As will be appreciated, components of dejitter circuitry 144 of FIG. 2 may be implemented by appropriate structures known in the art, such as hardware, instructions to be executed by a processor, or a combination thereof.

Parsers 220 and 224 are coupled to parse packet streams 208 and 212, respectively, for control information, such as input stream synchronizer (ISSY) fields associated with a DVB-T2 broadcast. In at least one embodiment, the control information included in packet streams 208 and 212 includes one or more of a parameter indicating a time interval between writing to and reading from dejitter buffer 228 (e.g., a time-to-output (TTO) field), a parameter indicating a buffer configuration size of dejitter buffer 228 (e.g., a BUFS field), and a timestamp parameter (e.g., an input stream time reference (ISCR) field). As an example, one or more of packet streams 208 and 212 may include several ISCR timestamps regularly spread within the packet streams.

Parsers 220 and 224 may include logic coupled to initially configure dejitter buffer 228 prior to parsing the corresponding control information associated with each of packet streams 208 and 212. For example, parsers 220 and 224 may include logic coupled to allocate respective portions of dejitter buffer 228 to packet streams 208 and 212 prior to determining parameters of packet streams 208 and 212 indicating respective buffer configuration sizes (e.g., BUFS fields).

Dejitter buffer 228 generates a dejittered output stream that includes packets of one or more received PLP streams. Dejitter buffer 228 may include a single buffer coupled to store packets of both packet streams 208 and 212. In at least one embodiment, dejitter buffer 228 is coupled to store packets of two received PLPs, where the combined size of the two received PLPs is predetermined (e.g., 262,144 bytes). Packets of one of the received PLPs (e.g., a data PLP) may be buffered beginning at the first address of dejitter buffer 228 (and incrementing thereafter) and packets of the other of the received PLPs (e.g., a common PLP) may be buffered beginning at the last address of dejitter buffer 228 (and decrementing thereafter). In at least one embodiment, dejitter buffer 228 includes configuration registers coupled to store results of calculations described below (e.g., a value indicating a time to output data stored at dejitter buffer 228 and a value indicating a rate at which to read data stored at dejitter buffer 228).

In at least one embodiment, write finite state machine (FSM) controller 232 determines when to request writing of packets of packet stream 208 to dejitter buffer 228. Similarly, in at least one embodiment, write FSM controller 236 determines when to request writing of packets of packet stream 212 to dejitter buffer 228. In at least one embodiment, write/read (W/R) circuitry 248 arbitrates the requests to read and write data to and from dejitter buffer 228 (e.g., by acting as a first-in, first-out (FIFO) arbiter).

In at least one embodiment, write operations to dejitter buffer 228 begin prior to determining parameters indicating buffer configuration sizes of dejitter buffer 228 (e.g., a BUFS field) indicated by packet streams 208 and 212. For example, write operations to dejitter buffer 228 may begin by allocating a portion n of dejitter buffer 228 to packet stream 208 and a complementary portion m−n of dejitter buffer 228 to packet stream 212, wherein dejitter buffer 228 has a total size m. In at least one embodiment, the complementary portion m−n is set automatically in response to allocating the portion n. In at least one embodiment, n=½, where half of dejitter buffer 228 is allocated to packet stream 208 and the other half of dejitter buffer 228 is allocated to packet stream 212 prior to determining the parameter indicating a buffer configuration size of the dejitter buffer 228. In at least one embodiment, packet streams 208 and 212 correspond to an interleaving frame (IF) of a DVB-T2 transmission and write operations to dejitter buffer 228 begin in response to receiving a portion of the IF and prior to parsing the BUFS field associated with the IF.

In at least one embodiment, after allocating the portions of dejitter buffer 228, W/R circuitry 248 initializes write and read addresses associated with dejitter buffer 228 to zero and begins incrementing a write counter in response to each byte of packet streams 208 and 212 written to dejitter buffer 228. While packets of packet streams 208 and 212 are being written to dejitter buffer 228, parser 220 or parser 224 may determine a parameter indicating a buffer configuration size j of dejitter buffer 228 indicated by a corresponding one of packet streams 208 and 212, respectively. In at least one embodiment, in response to determining the parameter, a portion j of dejitter buffer 228 is reallocated to the corresponding one of packet streams 208 and 212, and a complementary portion m−j is reallocated to the other of packet streams 208 and 212. Reallocating the complementary portion m−j to the other of packet streams 208 and 212 avoids a lag time associated with waiting for the parameter indicating a buffer configuration size of dejitter buffer 228 associated with the other of packet streams 208 and 212 prior to writing packets to dejitter buffer 228. In at least one embodiment, logic monitors whether the write address indicated by the write counter has exceeded the indicated buffer configuration size j. If the write address has exceeded j, an error is deemed to have occurred, and the indicated buffer configuration size j is recorded and used to configure dejitter buffer 228 during subsequent processing (e.g., during processing of a next interleaving frame).

In at least one embodiment, read FSM controller 240 determines when to request reading of packets from dejitter buffer 228. Read FSM controller 240 may be further responsive to an elementary frequency recovered during demodulation of received signals (e.g., by demodulation circuitry 132 of FIG. 1). In at least one embodiment, read FSM controller 244 determines when to request reading of packets from dejitter buffer 228. A read counter may be incremented in response to each byte read from dejitter buffer 228.

In at least one embodiment, read FSM controllers 240 and 244 include counters 276 and 278, respectively, which are coupled to determine when to output the packets stored at dejitter buffer 228 by counting to time interval end values associated with packet streams 208 and 212, respectively. For example, in at least one embodiment, time interval end value 320 of FIG. 3 corresponds to one of packet streams 208 and 212, and the corresponding counter 276 or 278 counts to the time interval end value 320 to determine when to output packets of the corresponding one of packet streams 208 and 212. When counter 276 or 278 reaches the time interval end value, packets of the corresponding packet stream 208 or 212 stored at dejitter buffer 228 are output.

In at least one embodiment, counters 276 and 278 are further coupled to begin the counting operation prior to determining (e.g., by parsers 220 and 224) the parameter that indicates the time interval between writing to and reading from the dejitter buffer (e.g., a TTO parameter). As an example, parsers 220 and 224 may cause counters 276 and 278, respectively, to begin incrementing in response to receiving packet streams 208 and 212 and while still waiting for TTO parameters associated with packet streams 208 and 212 to be determined. In this example, once respective TTO parameters associated with packet streams 208 and 212 have been determined, time interval end values (i.e., values indicating when to output packets from dejitter buffer 228) are determined based on the TTO parameters. Packets of packet streams 208 and 212 may be read from dejitter buffer 228 upon counters 276 and 278 reaching values corresponding to the time interval end values. In at least one embodiment, the time interval end value is determined by a co-processor, as described further below.

Accordingly, packets output by dejitter buffer 228 may be substantially synchronized (e.g., substantially dejittered). In at least one embodiment, one of packet streams 208 and 212 includes at least one packet associated with the other of packet streams 208 and 212 (e.g., one of packet streams 208 and 212 corresponds to a data PLP and the other of packet streams 208 and 212 corresponds to a common PLP that includes a packet associated with the data PLP stream). Dejitter circuitry 144 may also receive and dejitter a single packet stream (e.g., by inserting null packets according to null packet deletion (NPD) fields that may be present in the single packet stream). In at least one embodiment, recombiner 260 provides additional alignment (e.g., "fine-tuning") of the packets output by dejitter buffer 228.

Recombiner 260 may recombine synchronized packets output by dejitter buffer 228 to form output stream 264 (e.g., a Moving Pictures Expert Group transport stream (MPEG-TS)). Output stream 264 may include data packets corresponding to a received data PLP in addition to signaling information corresponding to a received common PLP. Output stream 264 may be converted to a suitable A/V signal (e.g., by decoder 116 of FIG. 1) for use by a display device (e.g., display device 120 of FIG. 1).

It will be appreciated that dejitter buffer 228 may be initialized (e.g., portions allocated) upon detecting a signal to be processed and data can be written rapidly to and dejittered by dejitter buffer 228 once such data is available, enabling sooner availability of the dejittered data (e.g., to decoder 116 of FIG. 1). For example, dejitter buffer 228 may be initialized at the start of an interleaving frame (IF) (n) and data are then written at the start of IF (n) (e.g., prior to TTO and BUFS fields of IF (n) being received or determined). Initializing dejitter buffer 228 and writing to dejitter buffer 228 at the start of IF (n) avoids delays associated with waiting for TTO and BUFS of IF (n) and the start of IF (n+1) before writing data of IF (n). Further, counters 276 and 278 may be initialized upon detecting a signal to be processed, such as IF (n), which also may avoid delays associated with waiting for a TTO field of IF (n).

Figure 9:
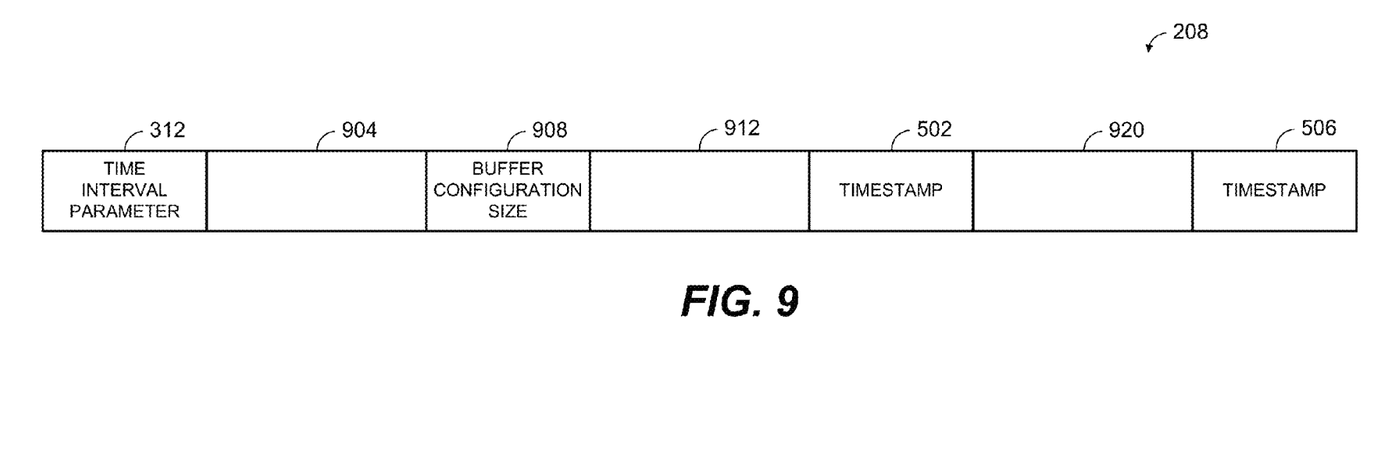
FIG. 9 depicts an embodiment of a portion of a packet stream to be dejittered according to at least one embodiment of the invention.

Referring to FIG. 9, a particular illustrative example of packet stream 208 of FIG. 2 includes parameter 312 indicating a time interval between writing and reading data, parameter 908 indicating a buffer configuration size, timestamp parameters 502 and 506, and data packets 904, 912, and 920. Parameters 312, 908, 502, and 506 may be parsed by parsers 220 and 224 of FIG. 2, as described with reference to FIG. 2. Data packets 904, 912, and 920 may be buffered at dejitter buffer 228 of FIG. 2. The example packet stream 208 of FIG. 9 may also correspond to packet stream 212 of FIG. 2. In at least one embodiment, one or more of data packets 904, 912, and 920 of packet stream 208 include at least one packet associated with packet stream 212.

Figure 10:
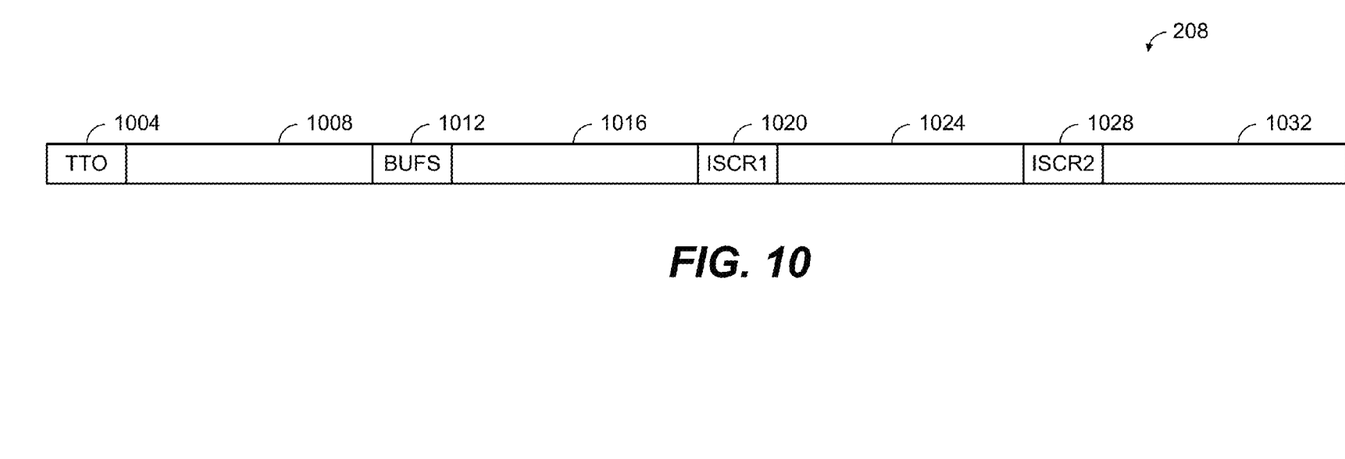
FIG. 10 depicts an embodiment of a portion of a packet stream to be dejittered according to at least one embodiment of the invention.

Referring to FIG. 10, a particular illustrative example of packet stream 208 of FIG. 2 includes TTO field 1004, BUFS field 1012, ISCR1 field 1020, ISCR2 field 1028, and data fields 1008, 1016, 1024, and 1032. In at least one embodiment, packet stream 208 of FIG. 10 is an interleaving frame associated with a DVB-T2 transmission and data fields 1008, 1016, 1024, 1032 include packets to be dejittered at dejitter buffer 228 of FIG. 2. The example packet stream 208 of FIG. 10 may also correspond to packet stream 212 of FIG. 2. In at least one embodiment, one or more of data fields 1008, 1016, 1024, and 1032 of packet stream 208 include at least one packet associated with packet stream 212.

Figure 3:
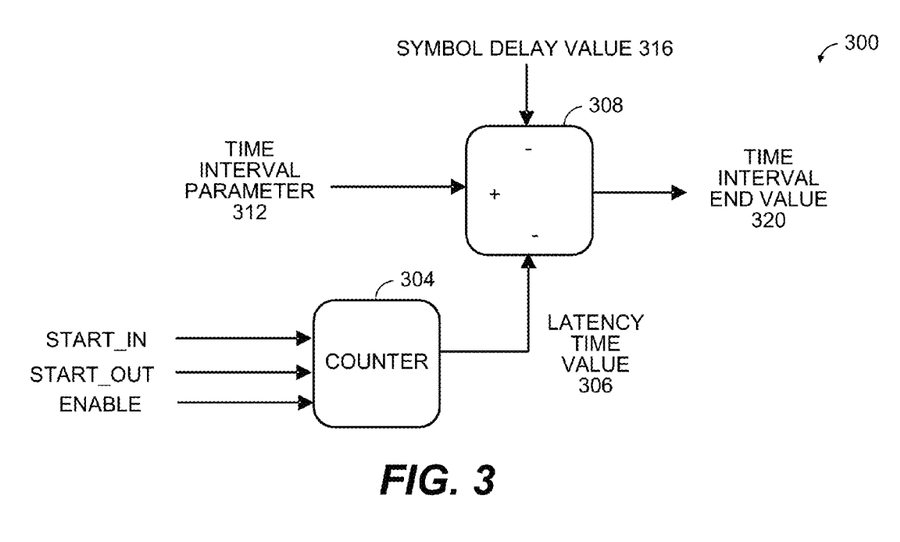
FIG. 3 is a block diagram of a co-processor according to at least one embodiment of the invention.

Referring to FIG. 3, co-processor 300 includes counter 304 and difference node 308. In at least one embodiment, co-processor 300 is a hardware co-processor formed by logic and hardware known in the art and that performs arithmetic operations. In at least one embodiment, counter 304 determines latency time value 306 associated with time deinterleaving of signals corresponding to packet streams 208 and 212 by counting time intervals between inputting and outputting signals to a time deinterleaver (which may be included in the FEC circuitry 140 of FIG. 1). Counter 304 may be responsive to control signals, such as START_IN and START_OUT, and ENABLE.

In at least one embodiment, difference node 308 is responsive to latency time value 306 determined by counter 304. In at least one embodiment, difference node 308 determines a time interval end value 320 by subtracting latency time value 306 and a symbol delay value 316 (e.g., 2048) from a time interval parameter 312. In at least one embodiment, time interval parameter 312 is a field of a packet stream parsed by parser 220 or 224 of FIG. 2 (e.g., a TTO parameter).

Time interval end value 320 determines when packets are output from dejitter buffer 228 of FIG. 2 (e.g., the packets are output when counter 276 of FIG. 2 reaches the value corresponding to time interval end value 320). In at least one embodiment, because co-processor 300 can be implemented relatively easily in hardware and may operate based on standard arithmetic operators, time interval end value 320 may be determined without utilizing a digital signal processor (DSP) for the computation (e.g., without pooling or interrupting a DSP to parse fields of packet streams, which may consume significant time and processing resources).

Figure 4:
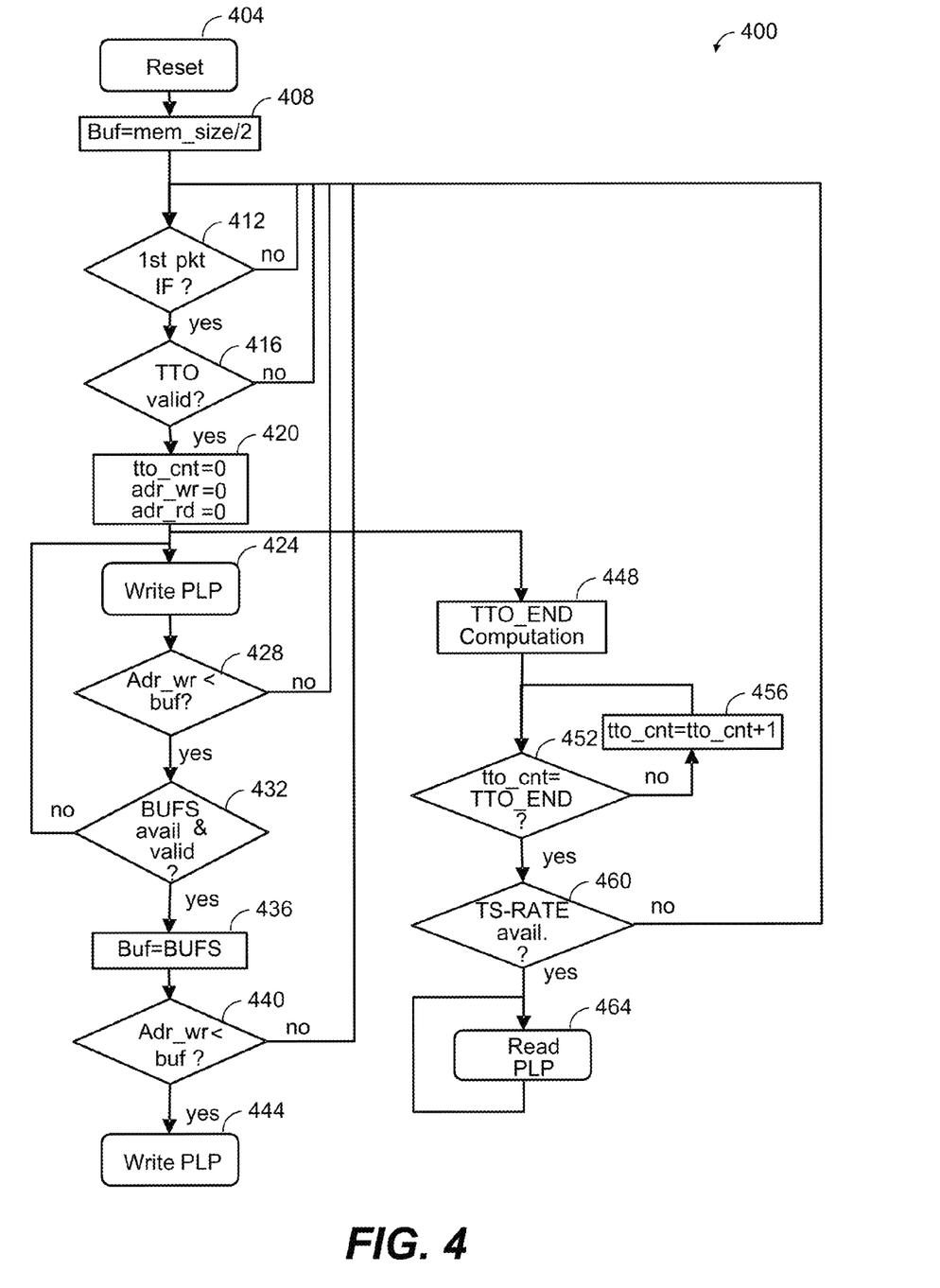
FIG. 4 is a flow chart of a method of processing jittered input streams according to at least one embodiment of the invention.

Referring to FIG. 4, a method 400 of processing jittered input streams is depicted in terms of the DVB-T2 standard. However, it should be appreciated that method 400 may be applied in contexts outside of the DVB-T2 standard as well. Method 400 includes resetting a buffer (e.g., by flushing dejitter buffer 228 of FIG. 2), at 404. Method 400 further includes allocating half of the buffer to a PLP to be received, at 408. At 412, method 400 includes detecting a received PLP that includes an interleaving frame (IF).

At 416, method 400 includes determining whether a valid time-to-output (TTO) parameter for the received PLP is available. If a valid TTO is available, a TTO counter, a write address counter, and a read address counter are reset, at 420. At 424, the received PLP is written to the buffer. In at least one embodiment, the received PLP is written to the buffer, at 424, even if a valid TTO is not yet available.

If the value of the write address is less than the current allocated size of the buffer, at 428, and a BUFS field is available and valid, at 432, then the portion of the buffer allocated to the received PLP is reallocated to size BUFS, at 436. If the value of the write counter is less than the current allocated size of the buffer, at 440, then method 400 includes continuing to write the received PLP to the buffer, at 444.

In at least one embodiment, logic monitors whether the current write address is less than the current allocated size of the buffer 228 (e.g., n or j as described with reference to FIG. 2). In response to the current write address exceeding the current allocated size, at 428 and at 440, an error is deemed to have occurred and method 400 includes returning to wait for a next interleaving frame.

Method 400 further includes computing a TTO_END parameter, at 448, determining whether a TTO counter has reached a value corresponding to the TTO_END parameter, at 452, incrementing the TTO counter, at 456, determining whether a TS_RATE is available, at 460, and reading the received PLP from the buffer based on the TS_RATE, at 464. Determining read rates (e.g., TS_RATE) is described further with reference to FIGS. 5-8.

Figure 5:
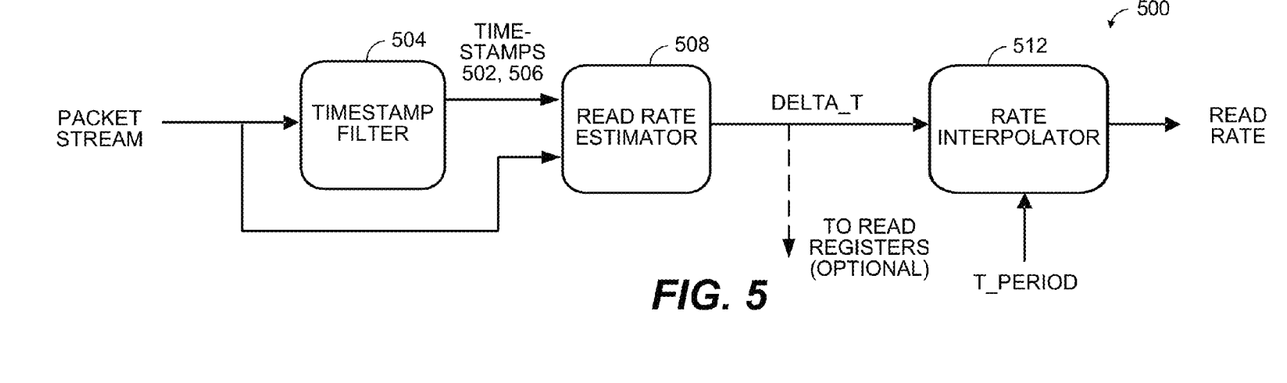
FIG. 5 is a block diagram of circuitry coupled to determine a read data rate according to at least one embodiment of the invention.

Referring to FIG. 5, circuitry 500 is coupled to determine a read data rate, such as a rate at which packets are to be read from dejitter buffer 228 of FIG. 2, which may be the TS_RATE of FIG. 4. In at least one embodiment, timestamp filter 504 is coupled to parse packets (e.g., packets of packet streams 208 and 212 of FIG. 2) for timestamp parameters 502 and 506 (e.g., input stream time reference (ISCR) fields associated with a DVB-T2 input stream).

In at least one embodiment, read rate estimator 508 is coupled to determine parameters NBITS and DELTA_T, where NBITS is a number of bits of a packet stream processed in a time DELTA_T between successive timestamps 502 and 506 parsed by timestamp filter 504 (e.g., a difference between successive ISCR fields). In at least one embodiment, read rate estimator 508 determines NBITS by multiplying a number of processed packets by a number of bytes per packet by a number of bits per byte.

In at least one embodiment, rate interpolator 512 is responsive to NBITS, DELTA_T, and an elementary period T_PERIOD to determine a read rate (e.g., a rate at which packets are to be read from dejitter buffer 228 of FIG. 2). In at least one embodiment, rate interpolator 512 interpolates a read rate TS_RATE. For example, suppose a DVB-T2 signal is received and a packet stream is generated based on the received DVB-T2 signal. In at least one embodiment, an elementary time period T is determined based on the received signal and is written to a write register. In at least one embodiment, the elementary time period T is a parameter of the DVB-T2 standard and is a function of bandwidth such that $T=7/(8*BW)$ (e.g., a bandwidth of 7 MHz may correspond to an elementary time period T of ⅛ μs).

In at least one embodiment, a value T_PERIOD is written to the write register, where T_PERIOD=8*T, and where T is the elementary time period measured in nanoseconds (ns). In at least one embodiment, based on T_PERIOD, a basis time period BASIS_PERIOD is determined according to BASIS_PERIOD=DELTA_ISCR*T_PERIOD/8, where DELTA_ISCR is a difference between received ISCR values. For example, in at least one embodiment, DELTA_ISCR is the difference (measured in terms of the elementary time period T) between successive ISCR fields of an interleaving frame associated with a DVB-T2 transmission. In at least one embodiment, hardware is coupled to determine BASIS_PERIOD, where the hardware includes a multiplier, a shift operator, and appropriate hardware logic. In at least one embodiment, the hardware is coupled to operate according to the exemplary processes of FIGS. 6 and 7 and the method of FIG. 8.

Figure 6:
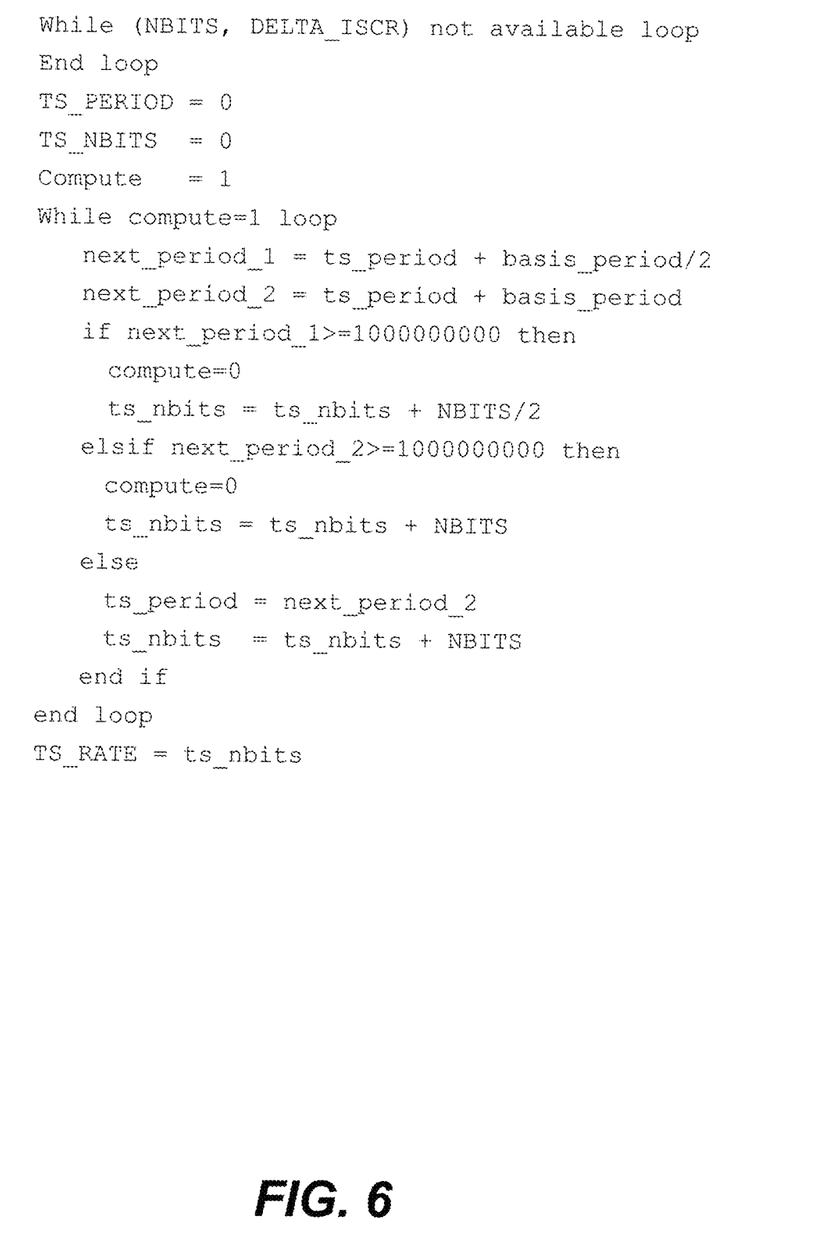
FIG. 6 depicts a process of determining a read data rate according to at least one embodiment of the invention.

Referring to FIG. 6, process 600 depicts pseudocode to determine a read rate TS_RATE by iteratively incrementing counter TS_PERIOD by basis time period BASIS_PERIOD until counter TS_PERIOD reaches a threshold value. In at least one embodiment, the threshold value corresponds to one second of time. For example, in at least one embodiment, elementary time period T is measured in nanoseconds (e.g., as explained with reference to FIG. 5) and the threshold value of counter TS_PERIOD is $1*10^9$.

As shown in FIG. 6, while counter TS_PERIOD indicates a value less than the threshold value, TS_PERIOD is incremented in terms of the basis period and counter ISNB_NBITS counts bits (i.e., NBITS) of the packet stream. In at least one embodiment, when counter TS_PERIOD reaches the threshold value corresponding to one second of time, the value indicated by counter TS_NBITS corresponds substantially to the read rate TS_RATE expressed in bits per second (since for example the value indicated by TS_NBITS indicates bits processed in approximately one second of time). At this time, the value indicated by counter TS_NBITS may correspond to a rate at which the received signal was transmitted (e.g., by transmitter 104 of FIG. 1) and data may be read (e.g., from dejitter buffer 228 of FIG. 2) at this rate.

As will be appreciated, the value indicated by TS_NBITS need not correspond precisely to the rate at which the received signal was transmitted. For example, by incrementing counter TS_PERIOD by the basis time period basis_period, TS_PERIOD may exceed the threshold value, allowing bits to be counted by counter TS_NBITS for more than one second of time. In at least one embodiment, such deviation of TS_PERIOD is corrected by a numerically controlled oscillator (NCO).

In at least one embodiment of process 600, multiple testing values are defined so as to reduce the "overshoot" of TS_PERIOD. For example, as depicted in FIG. 6, for each iteration of loop, next_period_1 and next_period_2 increment TS_PERIOD by basis_period/2 and basis_period, respectively. If TS_PERIOD plus half the basis_period reaches or exceeds the threshold value, then ts_nbits is correspondingly incremented by half of NBITS, yielding TS_RATE. If TS_PERIOD plus half the basis period does not reach the threshold value but TS_PERIOD plus the whole basis period reaches or exceeds the threshold value, then ts_nbits is correspondingly incremented by NBITS, yielding TS_RATE. If neither testing value causes TS_PERIOD to reach or exceed the threshold value, then TS_PERIOD is incremented by the basis period and loop performs another iteration. As another example, additional testing values are defined by the pseudocode depicted by process 700 of FIG. 7 (i.e., next_period_1 and next_period_3). Using multiple testing values may facilitate a "rounding" calculation rather than merely a truncation calculation (e.g., by reducing the amount by which TS_PERIOD "overshoots" the threshold value when multiple testing values exceed the threshold value), thus enabling a more precise calculation of TS_RATE.

Figure 7:
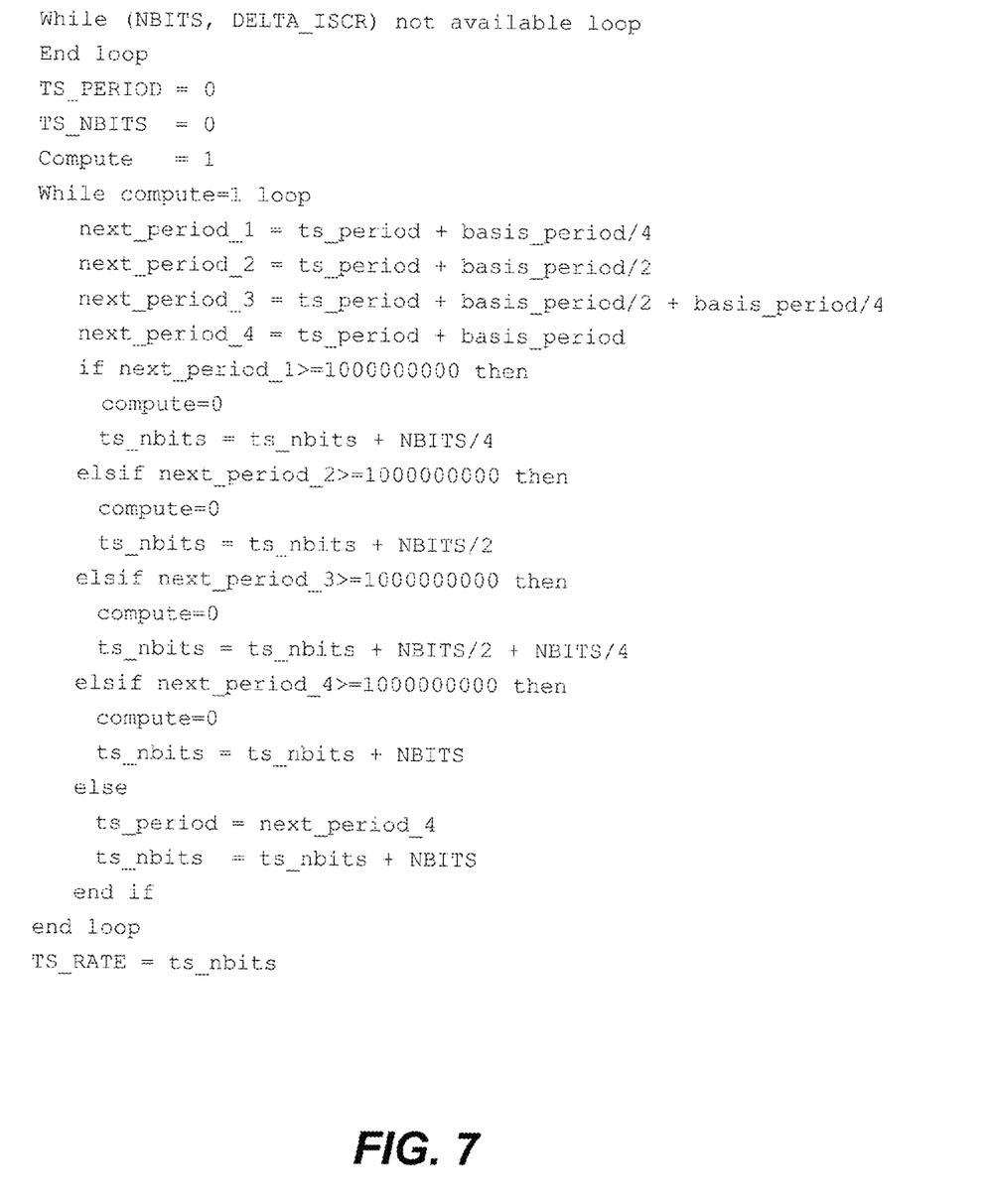
FIG. 7 depicts a process of determining a read data rate according to at least one embodiment of the invention.
Figure 8:
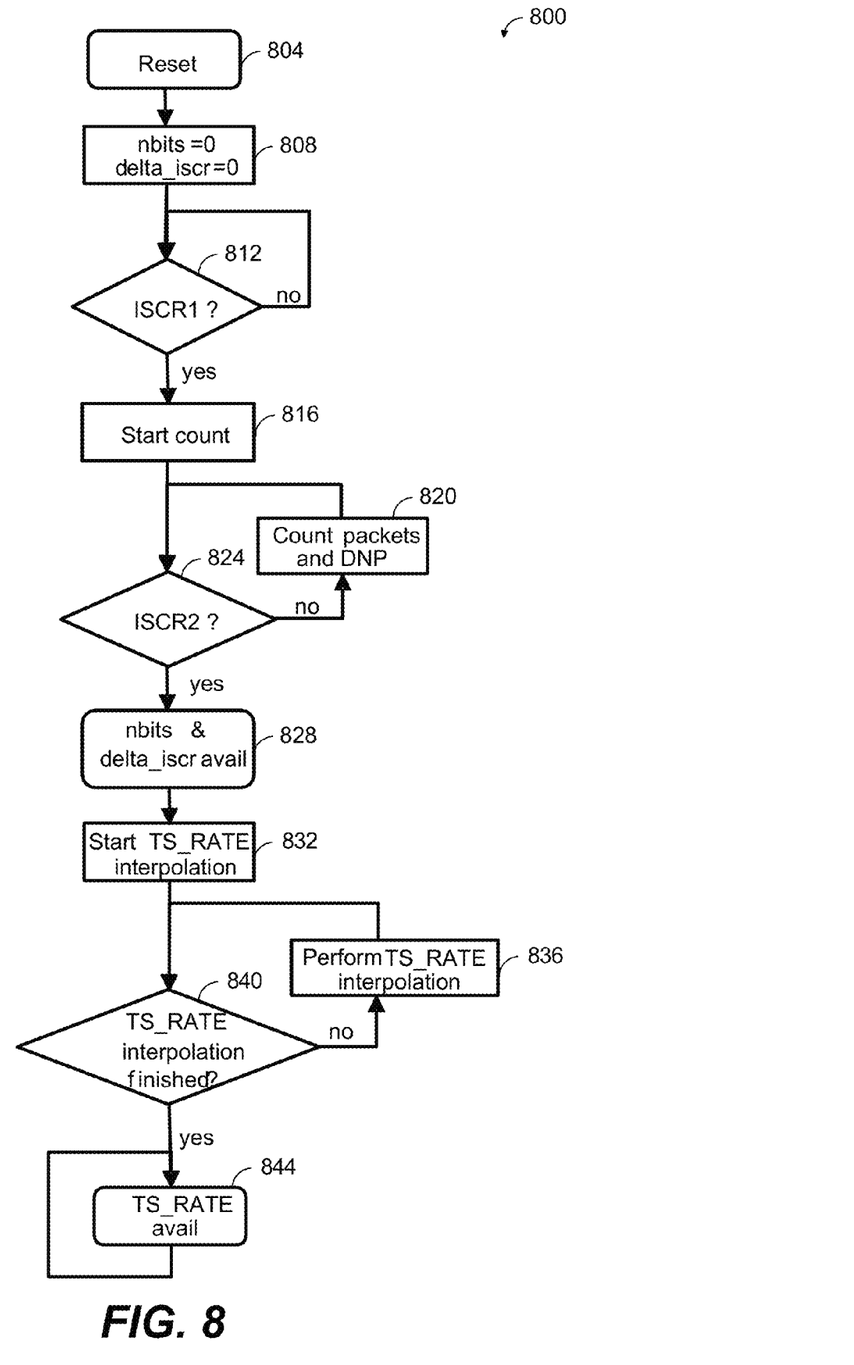
FIG. 8 is a flow chart of a method of determining a read data rate according to at least one embodiment of the invention.

Referring to FIG. 8, method 800 is depicted in terms of the DVB-T2 standard. However, it should be appreciated that method 800 (as well as other teachings herein) are not limited to contexts involving DVB-T2. Method 800 includes initialization (e.g., determining an elementary time period T and writing the elementary time period T to a write register), at 804, and resetting parameters NBITS and DELTA_ISCR to zero, at 808. Method 800 further includes determining ISCR1, at 812, and starting a counting operation (e.g., incrementing a counter), at 816. Packets and deleted null packets (DNP) are counted, at 820, until ISCR2 is determined, at 824. Once NBITS and DELTA_ISCR are available, at 828, interpolation of TS_RATE is begun, at 832. At 836, TS_RATE is interpolated (e.g., according to one of process 600 of FIG. 6 and process 700 of FIG. 7) and TS_RATE interpolation is finished, at 840. Method 800 further includes determining that TS_RATE is available, at 844. In at least one embodiment, method 800 further includes reading data (e.g., packets stored at dejitter buffer 228 of FIG. 2) at a rate corresponding to TS_RATE. In at least one embodiment, method 800 enables rapid determination of TS_RATE once two ISCR fields are acquired.

In at least one embodiment, process 600 of FIG. 6, process 700 of FIG. 7, and method 800 of FIG. 8 are performed by a co-processor (e.g., a hardware co-processor) and without using a DSP (e.g., without pooling or interrupting a DSP to determine TS_RATE). In other embodiments, processes 600 and 700 and method 800 may be implemented by a microcontroller, processor, DSP, or any combination of hardware and software appropriate for the particular application. As will be appreciated, process 600 of FIG. 6, process 700 of FIG. 7, and method 800 of FIG. 8 enable determination of TS_RATE relatively soon after DELTA_ISCR and NBITS have been determined, thus avoiding a situation where data should be read (e.g., from dejitter buffer 228 of FIG. 2) prior to the corresponding read rate being available (e.g., TS_RATE).

As an illustrative and non-limiting example, suppose a DVB-T2 frame of 200 ms includes 200 FEC blocks, and thus each FEC block lasts 1 ms. According to at least one embodiment, process 600 of FIG. 6 and process 700 of FIG. 7 each would iterate approximately 1,000 times to reach the threshold value corresponding to one second of time. According to at least one embodiment, assuming an example clock speed of 100 MHZ, iterating 1,000 times takes 10 µs is after DELTA_ISCR and NBITS are available (which in this example is 1/100 of one FEC block) to reach the threshold value and thus to generate a read rate. Accordingly, in at least one embodiment, circuitry 500 of FIG. 5, process 600 of FIG. 6, process 700 of FIG. 7, and method 800 of FIG. 8 each enable rapid determination of a read rate (e.g., TS_RATE) after a difference in timestamps (e.g., ISCR fields) is determined, thus potentially avoiding reaching a time to output data (e.g., end of a TTO interval) from a buffer (e.g., dejitter buffer 228 of FIG. 2) while the read rate is not yet available (e.g., while a DSP computes TS_RATE by, for example, directly computing NBITS/(DELTA_ISCR*T, which may consume significant time and processing resources).

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable media having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. For example, the computer-readable media may store instructions corresponding to the pseudocode depicted in FIGS. 6 and 7. The instructions/data may be related to hardware, software, firmware or combinations thereof.

The description of the invention set forth herein is illustrative, and is not intended to limit the scope of the invention as set forth in the following claims. Other variations and modifications of the embodiments disclosed herein may be made based on the description set forth herein, without departing from the scope of the invention as set forth in the following claims.

What is claimed is:

1. A method comprising:
generating, based on at least one received signal, a first packet stream and a second packet stream, wherein one of the first and second packet streams includes a packet associated with the other of the first and second packet streams, and wherein the first and second packet streams contain control information including respective buffer configuration sizes for the first and second packet streams in a dejitter buffer;
prior to determining the respective buffer configuration sizes based on the control information in the first and second packet streams, allocating respective first and second portions of the dejitter buffer to the first and second packet streams;
prior to determining the respective buffer configuration sizes indicated by the control information in the first and second packet streams, writing to the dejitter buffer data associated with the first and second packet streams;
determining the buffer configuration size indicated by the control information in the first packet stream; and
based on the buffer configuration size indicated by the control information in the first packet stream, reallocating the respective first and second portions of the dejitter buffer to the first and second packet streams.

2. The method as recited in claim 1 wherein the buffer configuration size indicated by the first packet stream indicates a size j, wherein the dejitter buffer is associated with a size m, wherein allocating the respective first and second portions includes allocating a first portion of size m/2 of the dejitter buffer to the first packet stream and a second portion of size m/2 of the dejitter buffer to the second packet stream, and wherein reallocating the respective first and second portions includes assigning a portion j of the dejitter buffer to the first packet stream and a portion m−j of the dejitter buffer to the second packet stream.

3. The method as recited in claim 1 wherein the first and second portions are allocated prior to determining a time interval between writing to and reading from the dejitter buffer indicated by the first packet stream.

4. The method as recited in claim 3 further comprising:
in response to detecting the first packet stream, resetting a counter coupled to count to a value corresponding to the time interval; and
prior to determining the time interval, incrementing the counter.

5. The method as recited in claim 4 further comprising:
determining the time interval;
continuing to write the data to the dejitter buffer while the counter indicates a value less than the value corresponding to the time interval; and
in response to the counter indicating the value corresponding to the time interval, determining whether a read rate parameter is available.

6. The method as recited in claim 5 further comprising:
determining that the read rate parameter is available; and
reading the data from the dejitter buffer based on the read rate parameter.

7. The method as recited in claim 1 wherein the received signal includes a data portion and a common portion, the method further comprising:
generating, based on the received signal, the first and second packet streams,
wherein the one of the first and second packet streams is associated with the common portion, and wherein the other of the first and second packet streams is associated with the data portion.

8. The method as recited in claim 1, wherein the allocating is performed by hardware coupled to the dejitter buffer.

9. The method as recited in claim 1 further comprising:
incrementing a first counter by a time period value until a value indicated by the first counter reaches or exceeds a threshold value;
while the value indicated by the first counter is less than the threshold value, incrementing a second counter to indicate a number of processed bits; and
in response to determining that the value indicated by the first counter has reached or exceeds the threshold value, determining a data rate for reading packets from the dejitter buffer based on the number of processed bits indicated by the second counter.

10. The method as recited in claim 9 wherein the time period value is based on a time difference between input stream time reference (ISCR) fields associated with the first packet stream.

11. The method as recited in claim 9 further comprising reading packets from the dejitter buffer based on the data rate.

12. The method as recited in claim 11 further comprising adjusting the data rate based on operation of a numerically controlled oscillator (NCO).

13. An apparatus comprising:
a dejitter buffer coupled to store packets of first and second packet streams, the first packet stream including a first field and the second packet stream including a second field, the first and second fields indicating respective first and second buffer configuration sizes of the dejitter buffer for the first and second packet streams;
logic configured to allocate respective first and second portions of the dejitter buffer to the first and second packet streams prior to determining the respective first and second buffer configuration sizes based on the first and second fields indicating the respective first and second buffer configuration sizes of the dejitter buffer;
wherein the logic is further configured to store packets in the dejitter buffer from the first and second packet streams prior to a determination of allocation of the dejitter buffer based on the first and second fields in the first and second packet streams;
wherein the logic is further configured to reallocate the first and second portions of the dejitter buffer based on the buffer configuration size for the first packet stream indicated by the first field in the first packet stream;
wherein the dejitter buffer is further configured to store the packets prior to determining a parameter of the first packet stream that indicates a time interval between writing to and reading from the dejitter buffer;
a first counter responsive to receipt of the first packet stream to begin a counting operation, the counting operation being associated with determining when to read the packets stored in the dejitter buffer, the counting operation beginning prior to determining the parameter of the first packet stream that indicates the time interval between writing to and reading from the dejitter buffer; and
read control logic responsive to the first counter reaching a time interval end value to cause packets to be read from the dejitter buffer, the time interval end value being based on the parameter of the first packet stream that indicates the time interval between writing to and reading from the dejitter buffer.

14. The apparatus as recited in claim 13 wherein the first counter begins the counting operation prior to determining the buffer configuration sizes.

15. The apparatus as recited in claim 13 further comprising a difference node responsive to the parameter that indicates the time interval between writing to and reading from the dejitter buffer, the difference node coupled to generate a signal indicating an end of the time interval.

16. The apparatus as recited in claim 13 further comprising a decoder coupled to the dejitter buffer to decode the packets read from the dejitter buffer.

17. The apparatus as recited in claim 13 further comprising a first parser and a second parser to receive the first and second packet streams, respectively, and coupled to supply packets to be written to the dejitter buffer.

18. An apparatus comprising:
a dejitter buffer coupled to store packets of first and second packet streams, the first packet stream including a first field and the second packet stream including a second field, the first and second fields indicating respective first and second buffer configuration sizes of the dejitter buffer for the first and second packet streams;
logic configured to allocate respective first and second portions of the dejitter buffer to the first and second packet streams prior to determining the respective first and second buffer configuration sizes based on the first and second fields indicating the respective first and second buffer configuration sizes of the dejitter buffer;
wherein the logic is further configured to store packets in the dejitter buffer from the first and second packet streams prior to a determination of allocation of the dejitter buffer based on the first and second fields in the first and second packet streams;
wherein the logic is further configured to reallocate the first and second portions of the dejitter buffer based on the buffer configuration size for the first packet stream indicated by the first field in the first packet stream; and a co-processor coupled to determine a data rate at which data is to be read from the dejitter buffer based on a time period associated with the first packet stream, the time period determined based on a difference between successive timestamps indicated by the first packet stream.

19. The apparatus as recited in claim 18 wherein the co-processor includes:
   a first counter coupled to count successive time periods associated with the first packet stream; and
   a second counter coupled to count bits of the first packet stream processed during counting of the successive time periods,
   wherein when the first counter has a value that exceeds a threshold value, a value of the second counter substantially corresponds to the data rate at which data is to be read from the dejitter buffer.

* * * * *